March 23, 1965 F. J. GOEBELS, JR 3,175,218

VARIABLE ELECTRONIC SLOT COUPLER

Filed March 1, 1963

INVENTOR.
FRANK J. GOEBELS JR.,
BY James K. Haskell
ATTORNEY.

3,175,218
VARIABLE ELECTRONIC SLOT COUPLER

Frank J. Goebels, Jr., Los Angeles, Calif., assignor to Hughes Aircraft Company, Culver City, Calif., a corporation of Delaware Filed Mar. 1, 1963, Ser. No. 261,963
8 Claims. (Cl. 343—768)

This invention relates generally to couplers for microwaves and more particularly to an electronically variable slot coupler utilizing the non-linear capacitive region of a varactor diode for varying the amplitude and phase of the energy radiated from a slot.

Prior devices for controlling the amplitude and phase of slot radiation include the ferrite phase shifter and the frequency dependent snake feed arrangement. Both devices, however, presented severe limitations which, in similar applications, would be obviated by the present invention. More specifically, with ferrites, the ever present problem of mutual coupling between successive control circuits is exceedingly difficult to solve; on the other hand, in a slot coupler constructed according to the invention, no such coupling problem would exist and therefore a less complicated electronic control circuit would be required for programing purposes. In addition, the instant slot coupler is not only lesser in weight and smaller in volume than the prior devices but also requires much less driving power, may be driven by either dry cell or solar cell batteries and, in response time, is faster due to the fast response time of a diode, therefore permitting electronic scanning speeds heretofore unobtainable. Of equal importance also is the ease with which the present slot coupler may be incorporated in any type of slot arrangement and in any type of transmission line.

In brief, the slot coupler of the invention includes a semiconductor variable capacitance diode hereafter referred to as a varactor diode located in a coaxial transmission line built into the wall containing the slot. A particularly suitable wall is the endplate of a standard waveguide transmission line. Continuing, the coaxial line is terminated in a variable short which, by proper displacement relative to the slot itself, is used to tune, so to speak, the diode. The center conductor of the coaxial line interconnects the variable short and the varactor diode and extends across the width of the slot to a standard coaxial RF choke. This type of diode circuitry permits either direct current or low frequency alternating current biasing of the varactor diode while still providing a low impedance RF path to the waveguide wall.

Operationally, the diode circuitry under these conditions becomes a shunt segment of the radiation impedance of the slot configuration. Thus, RF current coupled to the coaxial transmission line is strongly influenced by the behavior of the diode. The diode and its circuitry may be adjusted to provide an impedance in shunt across the slot, and under these conditions, the changes in the diode capacitance, induced by corresponding changes in the applied voltage bias, may then be used to control the phase and amplitude characteristics of the slot radiation.

Accordingly, it is an object of the present invention to provide an electronically variable slot coupler for microwaves.

Another object of the invention is to provide an electronically variable slot coupler capable of varying the amplitude and phase of the energy radiated from a slot in a controlled fashion.

A further object is to provide an electronically variable slot coupler of the type to be described that is light and compact and disposed in the plane of the slot itself.

A still further object of the invention is to provide a variable electronic slot coupler of the type to be described that may be readily incorporated in existing slots and slot arrays without detuning the slot or altering the original resonant frequency of the existing slots.

Another object is to provide a variable electronic slot coupler of the type described for slot arrays wherein a complex corporate feed structure is unnecessary.

In accordance with these and other objects and features of the invention, there is provided a slot coupler for microwaves comprising in combination a waveguide having a conductive wall including a radiating slot therein, a coaxial transmission line including a unilaterally conductive device having a characteristic non-linear capacitive region electromagnetically coupled to the slot, tuning means movably mounted in the coaxial line for varying the impedance thereof to the microwaves, a source of variable potential for biasing the conductive device in the capacitive region and choke means disposed in the coaxial line intermediate the source and the conductive device and coupled thereto, said choke means providing a low impedance path for the bias potential, a high impedance path for the microwaves between the conductive device and the potential source and a low impedance RF path between the conductive device and the waveguide wall.

The following specifications and the accompanying drawing describe and illustrate preferred embodiments of the present invention, like reference characters being used to designate like parts throughout the drawing, wherein.

Figures 1, 2, 3:
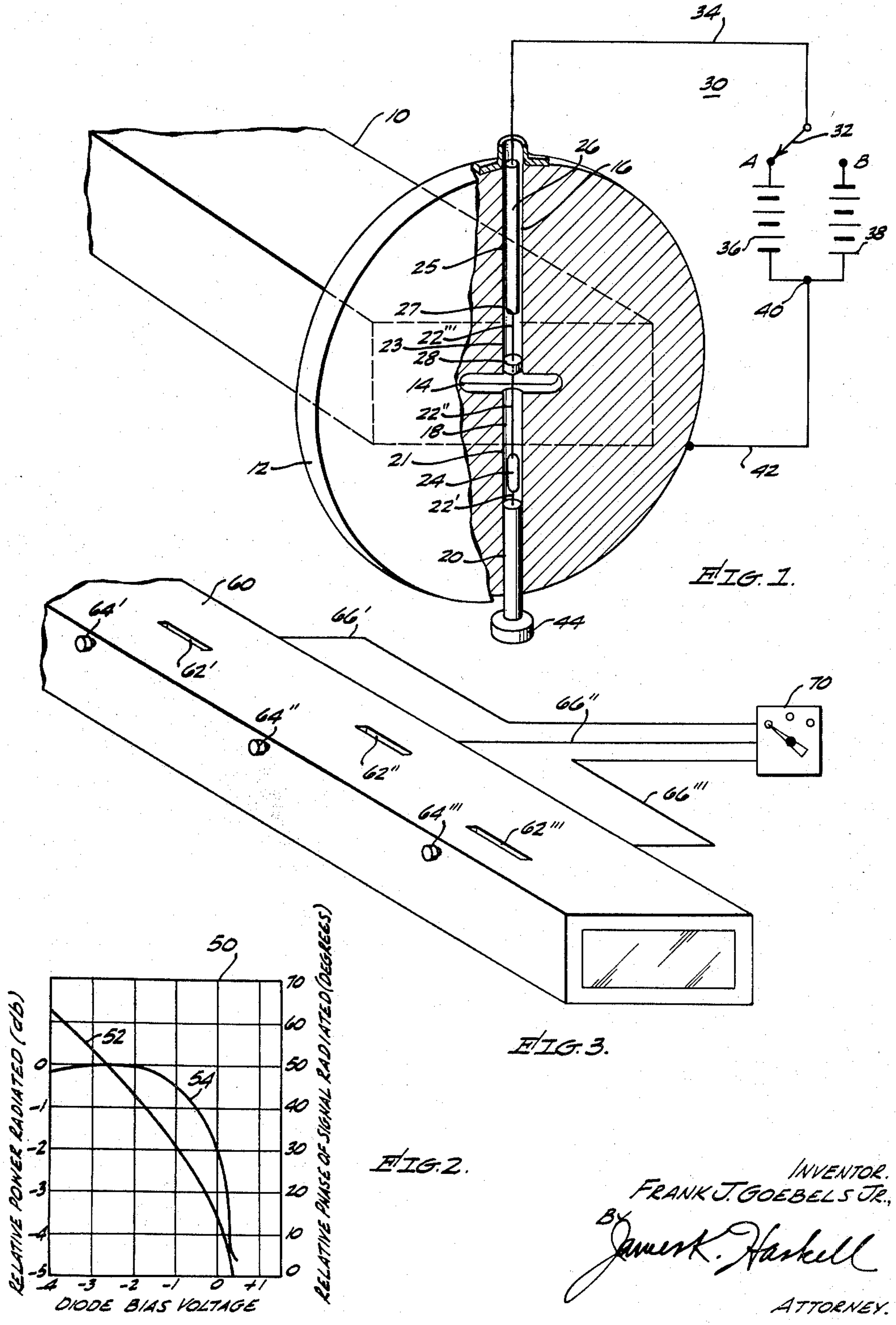
FIG. 1 is a perspective view partially in section showing a variable electronic slot coupler according to the present invention.
FIG. 2 shows a graph depicting the relationships between the amplitude and phase of the energy radiated as a function of a control voltage for the slot coupler of FIG. 1.
FIG. 3 is a perspective view of a slot array utilizing slot couplers in accordance with the invention.

Referring to FIG. 1 there is shown a waveguide 10 through which microwave energy is propagated and eventually radiated from a slot 14 disposed in a wall thereof as, for example, the endplate 12. Passing through the endplate 12 at substantially right angles to the slot 14 is a bore defining the openings 16 and 18 and forming the outer conductor of a coaxial transmission line 21.

An adjustable short or plunger 20 of conductive material is inserted in the opening 18 and forms a low impedance path to the endplate 12. A lower portion 22′ of a center conductor 22 extends upwardly to form the coaxial line 21 from the adjustable short 20 and is connected to a unilaterally conductive device having a non-linear capacitive region, such as the varactor diode 24. One commercially available diode suitable for S-band operation is manufactured by Hughes Aircraft Company and designated 1N896.

Connected to the other terminal of the varactor diode 24 is a middle portion 22″ of the center conductor 22 which continues upwardly along the axis of the opening 18, crossing the slot 14 and terminated at a conventional coaxial RF choke arrangement disposed in the opening 16.

An example of such a coaxial RF choke is shown in FIG. 1 and comprises two coaxial transmission lines 23 and 25 joined at the junction point 27. A cylindrical slug 28 of conductive material is disposed about the center conductor 22 in the opening 16 adjacent to the slot 14. The outer conductor of the coaxial lines 23 and 25 is formed by the inner cylindrical surface of the opening 16. In order to create a virtual short at a junction point 27, where the transmission lines 23 and 25 meet, the diameter of the center conductor 26 of the coaxial line 25 is made substantially larger than the diameter of the center conductor 22''' of the coaxial line 23. The slug 28 is also electrically isolated from the endplate 12 by inserting a layer of low loss dielectric material in the annular space between the slug 28 and the opening 16. Electrically, the slug 28 represents a lumped low impedance capacitance at the microwave frequency. By confining the electrical length of the coaxial line 23 to an odd multiple of quarter waveguide wavelengths, the virtual short existing at the junction point 27 is transformed and appears as a virtual open at the plane of the low impedance capacitance. Thus, microwave energy incident upon the impedance plane is primarily directed to the waveguide wall or endplate.

A biasing network 30 is provided for applying a variable bias voltage across the varactor diode 24. The network 30 includes a voltage source, as for example, the batteries 36 and 38, the opposite poles of which are joined at a junction point 40 and in turn grounded to the endplate 12 by a conductor 42. The other terminal of each of the batteries 36 and 38 is connected to one of the stationary contacts of, for example, a two position single pole switch 32, the movable contact of which is further connected by a conductor 34 to the conductor 26 of the coaxial line 25.

The voltage source may be a variable type, in which event, the polarity of the bias voltage is determined by the appropriate position of the switch 32 and the magnitude by the proper adjustment of the voltage source. In certain applications, a low frequency alternating voltage source, not shown, may suitably replace the batteries 36 and 38.

For ease in tuning the diode 24, a knurled knob 44 may be keyed to the plunger 20 at an outward extension thereof, and a threaded portion may be provided on the plunger 20 for displacing it axially within the opening 18 for reasons set forth below.

In the slot coupler configuration of FIG. 1, the diode 24 and the associated circuitry described above form a coaxial transmission line and represent a shunt impedance $Z_s$ across the slot 14. To obtain, for example, maximum radiation from the slot 14, the junction of the diode 24 is positioned an odd multiple of quarter waveguide wavelengths from the effective reference plane of the slot 14. Similarly, the upper end of the plunger 20 is positioned, as for example by turning the knob 44, a different odd multiple of quarter waveguide wavelengths from the effective reference plane of the slot 14 or, stated differently, an additional one half waveguide wavelength from the junction of the diode 24. With this arrangement, the magnitude of the shunt impedance $Z_s$ across the slot 14 equals:

$$Z_s=\frac{Z_o^2}{Z_d}$$

in ohms where, $Z_o$=the characteristic impedance of the coaxial line 21
$Z_d$=impedance of the diode 24

By now varying the bias of the diode 24 in an appropriate manner, the shunt impedance $Z_s$ may be selectively varied from a near open circuit impedance to a near short circuit impedance across the slot 14. When for example, the shunt impedance $Z_s$ is relatively large and analogously is an open circuit impedance, as obtained when the diode 24 is heavily biased negatively, the RF currents propagating through the waveguide 10 excite the slot 14 and cause it to radiate. By biasing the diode 24 less negatively, the diode capacitance is increased decreasing the shunt impedance $Z_s$. Accordingly, the phase and amplitude of the RF currents now exciting the slot 14 and radiated therethrough will be changed in a readily predictable fashion. A further decrease in the negative bias of the diode 24 results in additional changes in the phase and amplitude of the energy radiated until ultimately the slot is no longer excited and hence it no longer radiates.

The graph 50 of FIG. 2 shows the radiation characteristics of the slot coupler of FIG. 1. A line 52 on the graph 50 illustrates the relationship between the relative phase in degrees of the radiated energy as a function of bias voltage applied across the varactor diode 24; similarly, the relative power radiated in decibels as a function of bias voltage is indicated by a line 54. It should be noted that for a voltage bias ranging approximately between −4 volts and −2 volts for a slot coupler at S-band and utilizing the aforementioned 1N896 varactor type diode, the power radiated by the slot 14 is substantially unchanged while the phase angle changes approximately 20 electrical degrees. Further, at bias voltages above −2 volts, both the amplitude and the phase angle of the energy radiated change significantly as a function of the bias voltage. Thus, it is seen that the slot coupler shown and described in FIG. 1 may be utilized primarily for phase changes by restricting the range over which the bias voltage applied across the varactor diode 24 is varied. Outside of this range, both the amplitude and the phase of the energy radiated may be controlled in a predictable manner, including cut-off, by varying the bias voltage accordingly.

In FIG. 3, a portion of a slot array 60 is shown having shunt slots 62', 62'', 62''' disposed in the waveguide broadwall along its centerline and transversely displaced therefrom. Other types of slots and/or slot configurations may be substituted for the slot array 60. Each of the slots 62 is provided with a slot coupler of the type described in FIG. 1, even though only the adjustable plungers 64, similar to the plunger 20, can be seen in FIG. 3 extending outwardly from the upper portion of the narrow wall of the waveguide. Each of the slots 62', 62'', 62''' is connected by means of conductors 66', 66'', 66''' respectively to a controller 70 which may have a conventional circuit arrangement permitting separate or simultaneous bias voltage adjustments for the corresponding diodes. Thus, the phase or the amplitude and phase of each or all of the slots 62 and hence the radiation pattern of, for example, the slot array 60 may be readily varied as desired.

Not only may other types of slots and/or slot group configurations located in any type of transmission line be equipped in accordance with the invention, but also, existing slots or slot arrays may be so modified and equipped to function as set forth above without detuning the slot and causing a significant shift in its original resonant frequency.

Thus, there has been shown and described a variable electronic slot coupler for controlling the phase or the amplitude and phase of the energy radiated from a slot. The resultant slot coupler is simple and compact in structure, light in weight and readily adaptable in new or existing slot and slot arrays regardless of the type of slot or the slot group configuration.

While only preferred embodiments of the invention have been set forth, others may be made without departing from the intended scope of the invention, the purpose here being primarily descriptive and not limiting in any sense.

What is claimed is:

1. In a slot coupler for microwaves, the combination comprising a waveguide having a conductive wall including a radiating slot therein; a coaxial transmission line including a unilaterally conductive device having a characteristic non-linear capacitive region electromagnetically coupled to said slot; tuning means movably mounted in said coaxial line for varying the impedance thereof to said microwaves; a source of variable potential for biasing said unilaterally conductive device in said non-linear capacitive region; and choke means disposed in said coaxial line intermediate said source and said unilaterally conductive device and coupled thereto, said choke means providing a low impedance path for said bias potential, a high impedance path for the microwaves between said unilaterally conductive device and said potential source and a low impedance path for said microwaves between said unilaterally conductive device and said waveguide wall.

2. In a variable slot coupler for microwaves, the combination comprising a waveguide having a conductive wall including a radiating slot therein; a coaxial transmission line including a varactor diode electromagnetically coupled to said slot; tuning means movably mounted in said coaxial line for varying the impedance thereof to said microwave; a source of variable potential for biasing said varactor diode; and choke means disposed in said coaxial line intermediate said source and said diode and coupled thereto, said choke means providing a low impedance path for said bias potential, a high impedance path for the microwaves between said varactor diode and said potential source and a low impedance path for said microwaves between said varactor diode and said waveguide wall.

3. A microwave slot coupler comprising a conductive plate having a radiating slot disposed therein; a coaxial transmission line extending from said plate transversely to said slot and electromagnetically coupled thereto, said coaxial line comprising tuning means including a movable short, a varactor diode connected at one lead thereof to said movable short, the other lead of said varactor diode forming the center conductor of said coaxial line and transversing said slot, and choke means connected to said other lead; and a source of potential connected to said coaxial line for selectively biasing said varactor diode, said choke means providing a low resistance path for current flow from said potential source to said varactor diode and a high impedance path for current flow to said potential source at the frequencies of radiation.

4. An apparatus for controlling slot radiation comprising, a waveguide including a wall having a slot and openings extending therefrom through said wall; a unilaterally conductive device having a characteristic including a non-linear capacitive region disposed in one of said openings near said slot; tuning means coupled to one terminal of said device and forming a low impedance path between said terminal and said waveguide wall; choke means disposed in the other of said openings and coupled to said device at the other terminal thereof, said choke means forming a high impedance path between said other terminal and said waveguide wall to currents other than the displacement currents intercepted by said slot; a conductor coaxially disposed in said openings and electrically connected between said device and said choke means, said conductor extending across said slot; and a source of bias potential coupled between said tuning means and said choke means for biasing said device into said non-linear capacitive region.

5. A microwave slot coupler comprising in combination a waveguide having a radiating slot disposed in a wall thereof; and means forming a coaxial transmission line electromagnetically coupled to said slot and comprising a unilaterally conductive device having a characteristic including a non-linear capacitive region, a conductor centrally disposed in said coaxial transmission line and forming first and second extensions from the terminals of said device, said first extension crossing said slot, tuning means including an adjustable short connected to said center conductor for grounding said second extension to said wall at a predetermined distance from said slot, a source of bias potential, circuit means connecting one terminal of said source to said waveguide and the other terminal of said source to said first extension, and choke means disposed in said circuit means intermediate said other terminal and said first extension for providing a low impedance path to said waveguide wall for the high frequency displacement currents exciting said slot and for preventing the flow of said displacement currents to said source of bias potential.

6. A microwave slot coupler for controlling slot radiation comprising, in combination, a waveguide having a wall including a radiating slot therein; a coaxial transmission line disposed within said wall and including an inner conductor extending transversely across said slot, the outer conductor of said coaxial transmission line being formed by the inner cylindrical surface of first and second openings extending through said wall along a line substantially at right angles to said slot at the center thereof; tuning means including an adjustable short movably mounted in said first opening and providing a conductive path between said inner conductor and said waveguide wall; a varactor diode having a characteristic non-linear capacitive region disposed in said first opening intermediate said slot and said tuning means; and means including adjustable voltage source electrically coupled to said diode and including switch means for biasing said diode between high and low capacitive states within said non-linear capacitive region; and choke means disposed in said second opening intermediate said voltage source and said diode, said choke means substantially inhibiting the microwave energy from flowing to said voltage source and passing substantially all of said energy to said waveguide wall.

7. A microwave slot coupler comprising a conductive plate including a radiating slot and an opening extending through said plate transversely to said slot at the center thereof; a varactor diode disposed in said opening and including first and second leads extending from the ends thereof coaxially in said opening; a movable member of conductive material connected to said first lead and disposed in said opening in electrical contacting relationship with said plate; a source of bias potential including switch means having first and second operative positions; and circuit connecting means for connecting one terminal of said potential source to said conductive plate and including choke means intermediate the other terminal of said potential source and said diode to form a conductive path of low impedance to the flow of current from said source and a conductive path of high impedance to the flow of displacement currents to said source, the impedance of said diode being very small and very large relative to that of said slot when said switching means is disposed in said first and second operative positions respectively to provide respective short circuit paths and open circuit paths for the displacement currents intercepted by said slot.

8. A microwave slot coupler comprising in combination, a waveguide having a radiating slot cut in a wall thereof; network means electromagnetically coupled to said slot and disposed within a bore extending through said wall transversely to said slot, said network means comprising a varactor diode having a characteristic non-linear capacitive region mounted in said bore in spaced apart relationship therewith, a wire conductor extending coaxially in said bore from the terminals of said diode and crossing said slot, tuning means including a movable conductive plunger connected at one end of said wire conductor and in electrical contacting relationship with said waveguide wall, and choke means connected to the other end of said wire conductor and providing a conductive path for the displacement currents intercepted by said slot; and voltage source means external of said bore and coupled to said tuning means and said choke means, said voltage source means including means for varying the amplitude and the polarity of the voltage from said source means to selectively bias said diode in certain portions of the non-linear capacitive region to selectively control the amplitude and the phase of the radiation emanating from said slot.

(References on following page)

References Cited by the Examiner

UNITED STATES PATENTS

| | | | |
|---|---|---|---|
| 2,586,895 | 2/52 | Willoughby | 343—770 |
| 2,632,851 | 3/53 | Lees et al. | 343—768 |
| 2,684,444 | 7/54 | Fales | 342—770 |
| 2,794,184 | 5/57 | Kolar et al. | 343—767 |
| 2,821,708 | 1/58 | Blawcher | 343—768 |
| 2,951,172 | 10/60 | Howell et al. | 343—746 |
| 3,004,259 | 10/61 | Shanks et al. | 343—768 |
| 3,067,394 | 12/62 | Zimmerman et al. | 307—885 |

OTHER REFERENCES

Pedinoff: Negative-Conductance Slot Amplifier, IRE Transactions on Microwave Theory and Techniques, November 1961, page 558 relied on.

HERMAN KARL SAALBACH, *Primary Examiner.*